US010224846B2

(12) United States Patent
Nito

(10) Patent No.: US 10,224,846 B2
(45) Date of Patent: Mar. 5, 2019

(54) SHEET CONVEYING APPARATUS AND IMAGE FORMING APPARATUS

(71) Applicant: CANON KABUSHIKI KAISHA, Tokyo (JP)

(72) Inventor: Yuta Nito, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 15/807,457

(22) Filed: Nov. 8, 2017

(65) Prior Publication Data

US 2018/0152126 A1 May 31, 2018

(30) Foreign Application Priority Data

Nov. 29, 2016 (JP) ................................. 2016-231771

(51) Int. Cl.
| | |
|---|---|
| *H02P 21/14* | (2016.01) |
| *H02P 8/14* | (2006.01) |
| *G03G 15/00* | (2006.01) |
| *B65H 5/06* | (2006.01) |
| *B65H 9/00* | (2006.01) |

(Continued)

(52) U.S. Cl.
CPC ............. *H02P 8/14* (2013.01); *B41J 11/007* (2013.01); *B65H 5/062* (2013.01); *B65H 9/006* (2013.01); *G03G 15/6529* (2013.01); *G03G 15/6567* (2013.01); *H02P 21/24* (2016.02); *B65H 2301/44318* (2013.01); *B65H 2511/212* (2013.01); *B65H 2515/32* (2013.01); *B65H 2515/704* (2013.01); *B65H 2801/03* (2013.01); *B65H 2801/06* (2013.01)

(58) Field of Classification Search
CPC ............. G03G 15/505; G03G 15/6529; B65H 2511/212; B65H 2515/32; B65H 5/06; B65H 7/20; B41J 11/007; H02P 23/24; H02P 6/28; H02P 21/14; H02P 21/22
See application file for complete search history.

(56) References Cited

U.S. PATENT DOCUMENTS

| | | | | |
|---|---|---|---|---|
| 5,122,715 A | * | 6/1992 | Kimura | ..................... H02P 6/06 318/400.06 |
| 9,815,654 B2 | * | 11/2017 | Shishikura | ............. B65H 29/62 |

(Continued)

FOREIGN PATENT DOCUMENTS

JP          2007153273 A       6/2007

*Primary Examiner* — Thai Dinh
(74) *Attorney, Agent, or Firm* — Canon U.S.A., Inc. IP Division

(57) ABSTRACT

A sheet conveying apparatus for conveying a sheet includes a conveyance roller, a motor, a phase determiner, and a controller. The phase determiner determines a rotor rotation phase of the motor that drives the conveyance roller to convey the sheet. The controller controls so that a value of a rotor torque current component becomes a target value of the torque current component and controls so that an excitation current component value becomes a target value of the excitation current component, and controls to reduce a deviation between a command phase and the determined rotation phase. The controller controls so that a magnetic flux penetrating through a winding is weaker than a magnetic flux of the rotor, and so that a magnetic flux penetrating through the winding in a second period is stronger than the magnetic flux penetrating through the winding in the first period.

20 Claims, 11 Drawing Sheets

(51) Int. Cl.
    *B41J 11/00*     (2006.01)
    *H02P 21/24*     (2016.01)

(56) References Cited

U.S. PATENT DOCUMENTS

| | | | |
|---|---|---|---|
| 2012/0236375 A1* | 9/2012 | Fujita | H04N 1/00567 358/498 |
| 2013/0099708 A1* | 4/2013 | Shimizu | H02P 21/146 318/400.39 |
| 2016/0145062 A1* | 5/2016 | Kamatani | H02P 6/16 271/275 |

* cited by examiner

SHEET CONVEYING APPARATUS AND IMAGE FORMING APPARATUS

BACKGROUND OF THE INVENTION

Field of the Invention

The present disclosure relates to a sheet conveying apparatus and an image forming apparatus which control driving of a motor.

Description of the Related Art

As a method for controlling a motor, a control method referred to as vector control which controls a motor by controlling a current value in a rotating coordinate system based on a rotation phase of a rotor of the motor is conventionally known. Specifically, a control method which controls a motor by performing phase feedback control for controlling a current value in a rotating coordinate system so as to reduce a deviation between a command phase and an actual rotation phase of a rotor is known. In addition, a control method which controls a motor by performing speed feedback control for controlling a current value in a rotating coordinate system so as to reduce a deviation between a command speed and an actual rotation speed of a rotor is also known.

In the vector control, a drive current supplied to a motor winding is expressed by a current component generating torque for a rotor to rotate (a torque current component) and a current component affecting intensity of a magnetic flux penetrating through the motor winding (an excitation current component). A value of the torque current component is controlled in response to a change in load torque in the rotor and thus the torque needed for rotation is efficiently generated. Accordingly, increase of motor sound and increase of power consumption caused by surplus torque can be suppressed. In addition, the vector control can suppress a phenomenon that the rotor is not synchronized with an input signal because the load torque in the rotor exceeds output torque corresponding to a drive current supplied to the motor winding, and thus the motor becomes an uncontrollable state (a step-out state). Further, when the vector control is performed, a value of the excitation current component is normally controlled to be zero. Accordingly, increase of power consumption can be suppressed.

In the winding of each phase of the motor, an induced voltage is generated by rotation of the rotor. When the induced voltage is generated in the motor winding, a voltage which can be applied to the motor winding is reduced. Specifically, for example, when a voltage of a power supply for applying a voltage to the motor winding is 24 V, a voltage obtained by subtracting the induced voltage generated in the winding from the power supply voltage (24 V) is the voltage which can be applied to the winding. Therefore, the induced voltage is generated in the winding, and the voltage which can be applied to the motor winding becomes less than 24 V. A magnitude of the induced voltage becomes larger as a rotation speed of the rotor is faster. Therefore, as the rotation speed of the rotor is faster, the voltage which can be applied to the motor winding is reduced. When the voltage which can be applied to the motor winding is reduced, torque (hereinbelow, referred to as torque T) which can be applied to the rotor is reduced.

Japanese Patent Application Laid-Open No. 2007-153273 describes a configuration (field weakening) which weakens intensity of a magnetic flux penetrating through a motor winding by controlling a value of an excitation current component to a negative value corresponding to a rotation speed of a rotor when the rotation speed is greater than or equal to a speed threshold value. A correspondence relationship between the rotation speed and the excitation current component is a one-on-one relationship. In other words, a predetermined value of an excitation current component is set to a predetermined rotation speed. When field weakening is performed, a magnitude of an induced voltage generated in a winding is reduced. Accordingly, it can be suppressed that a voltage which can be applied to a winding is reduced, and the torque T can be prevented from being reduced. As a value of an excitation current component is a negative value having a larger absolute value, reduction of the torque T can be more securely prevented.

In an image forming apparatus, a rotor of a motor rotates at a predetermined speed (at a constant speed), and thus a conveyance roller is driven. Further, a leading edge of a recording medium enters conveyance rollers driven by the motor rotating at the predetermined speed, and the recording medium is conveyed by the conveyance rollers. In other words, a period in which the rotor of the motor rotates at the predetermined speed includes a period in which the conveyance rollers do not nip the recording medium and a period in which the conveyance rollers nip the recording medium. When a leading edge of a recording medium enters the conveyance rollers, load torque in the rotor is increased. In addition, the load torque in the rotor in the period in which the conveyance rollers nip the recording medium is larger than the load torque in the rotor in the period in which the conveyance rollers do not nip the recording medium. In other words, when the conveyance roller is driven, the load torque in the rotor changes in the period in which the rotor rotates at the predetermined speed. Further, in the period in which the rotor rotates at the predetermined speed, the torque T is reduced due to the induced voltage generated in the winding. Therefore, when the conveyance roller is driven, the load torque in the rotor may exceed the torque T in the period in which the rotor rotates at the predetermined speed. When the load torque in the rotor exceeds the torque T, the rotor does not rotate.

According to the configuration described in Japanese Patent Application Laid-Open No. 2007-153273, the correspondence relationship between the rotation speed and the excitation current component is the one-on-one relationship. Therefore, a predetermined value of an excitation current component corresponding to a predetermined rotation speed is set in the period in which the rotor rotates at the predetermined speed.

As described above, torque in the period in which the conveyance rollers nip a recording medium is larger than the torque in the period in which the conveyance rollers do not nip a recording medium in the period in which the rotor rotates at the predetermined speed. In other words, when the configuration described in Japanese Patent Application Laid-Open No. 2007-153273 is applied to control of a motor for driving conveyance rollers, it is necessary to set a value of an excitation current component in consideration of load torque in a period in which the conveyance rollers nip a recording medium so that the load torque does not exceed the torque T.

As an absolute value of the excitation current component value is larger, a current supplied to the motor winding is increased. Therefore, when the value of the excitation current component is determined in consideration of the load torque in the period in which the conveyance rollers nip a recording medium, an unnecessary current is supplied to the winding in the period in which the conveyance rollers do not nip a recording medium. Accordingly, power consumption is increased.

SUMMARY OF THE INVENTION

The present disclosure is directed to efficient control of a motor in consideration of the above-described issues.

According to an aspect of the present invention, a sheet conveying apparatus for conveying a sheet includes a conveyance roller configured to convey the sheet, a motor configured to drive the conveyance roller, a phase determiner configured to determine a rotation phase of a rotor of the motor, and a controller configured to control a drive current flowing through a winding of the motor so that a value of a torque current component generating torque in the rotor which is expressed in a rotating coordinate system based on a rotation phase determined by the phase determiner becomes a target value of the torque current component and to control a drive current flowing through the winding so that a value of an excitation current component affecting intensity of a magnetic flux penetrating through the winding which is expressed in the rotating coordinate system becomes a target value of the excitation current component, wherein the controller sets the target value of the torque current component so as to reduce a deviation between a command phase representing a target phase of the rotor and the rotation phase determined by the phase determiner, wherein, in a period in which the rotor rotates at a predetermined speed, the controller sets the target value of the excitation current component so that a magnetic flux penetrating through the winding in a first period which is after a leading edge of the sheet reaches a predetermined position on an upstream side of the conveyance roller in a conveyance direction to which the sheet is conveyed is weaker than a magnetic flux of the rotor, and sets the target value of the excitation current component so that a magnetic flux penetrating through the winding in a second period which is before the leading edge of the sheet reaches the predetermined position is stronger than the magnetic flux penetrating through the winding in the first period.

Further features of the present invention will become apparent from the following description of embodiments with reference to the attached drawings.

DESCRIPTION OF THE EMBODIMENTS

Various embodiments of the present invention will now be described in detail below with reference to the attached drawings. However, shapes of components described in the embodiments and their relative positions are to be appropriately changed depending on a configuration and various conditions of an apparatus to which the present invention is applied and thus, the scope of the present invention is not limited only to the embodiments described below. A case in which a motor control apparatus is installed in an image forming apparatus is described below, however, it is not limited to the image forming apparatus in which the motor control apparatus is installed. For example, the motor control apparatus may be used in a sheet conveyance apparatus for conveying a sheet of a recording medium, a document, and the like and other apparatuses.

[Image Forming Apparatus]

Figure 1:
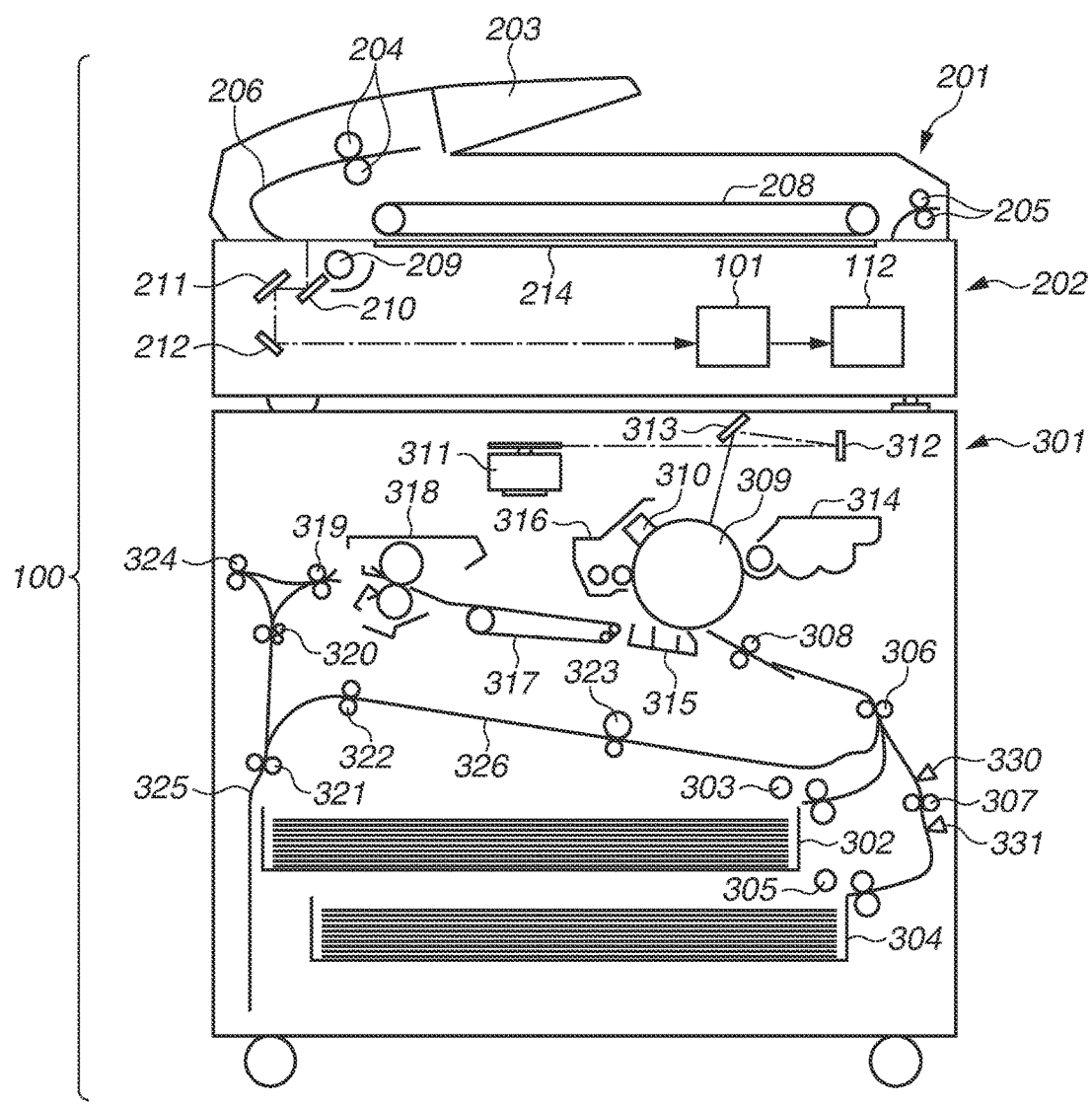
FIG. 1 is a cross-sectional view illustrating an image forming apparatus according to a first embodiment.

FIG. 1 is a cross-sectional view illustrating a configuration of an electrophotographic method monochromatic copy machine (hereinbelow, referred to as an image forming apparatus) 100 including a sheet conveyance apparatus used in a first embodiment. The image forming apparatus is not limited to the copy machine and may be, for example, a facsimile apparatus, a printing apparatus, and a printer. Further, the recording method is not limited to the electrophotographic method, and, for example, an ink jet method can be used. Furthermore, the image forming apparatus may adopt any of a monochromatic format or a color format.

A configuration and a function of the image forming apparatus 100 are described below with reference to FIG. 1. The image forming apparatus 100 includes a document feeding apparatus 201, a reading apparatus 202, and an image printing apparatus 301.

A document placed on a document stacking unit 203 of the document feeding apparatus 201 is fed one sheet each by a sheet feeding roller 204 and conveyed onto a document glass platen 214 of the reading apparatus 202 along a conveyance guide 206. Further, the document is conveyed at a constant speed by a conveyance belt 208 and discharged to a discharge tray, which is not illustrated, by a sheet discharge roller 205. Reflected light from a document which is illuminated by an illumination system 209 at a reading position of the reading apparatus 202 is guided to an image reading unit 111 by an optical system constituted of reflection mirrors 210, 211, and 212 and converted into an image signal by the image reading unit 111. The image reading unit 111 is constituted of a lens, a charge coupled device (CCD) as a photoelectric conversion element, a driving circuit of the CCD, and the like. An image signal output from the image reading unit 111 is subjected to various correction processing by an image processing unit 112 constituted of a hardware device such as an application specific integrated circuit (ASIC) and output to the image printing apparatus 301. Reading of a document is performed as described above. In other words, the document feeding apparatus 201 and the reading apparatus 202 function as a document reading apparatus.

Document reading modes includes a first reading mode and a second reading mode. The first reading mode is a mode for reading an image on a document conveyed at a constant speed by the illumination system 209 and the optical system which are fixed to a predetermined position. The second reading mode is a mode for reading an image on a document placed on the document glass platen 214 of the reading apparatus 202 by the illumination system 209 and the optical system which move at a constant speed. Normally, a sheet-shaped document is read in the first reading mode, and a bound document such as a book and a booklet is read in the second reading mode.

The image printing apparatus 301 includes sheet storage trays 302 and 304 therein. The sheet storage trays 302 and 304 each can store different types of recording media. For example, the sheet storage tray 302 stores A4 size plain paper, and the sheet storage tray 304 stores A4 size thick paper. A recording medium is the one on which an image is formed by the image forming apparatus, and, for example, a sheet, a resin sheet, cloth, an overhead projector (OHP) sheet, a label, and the like are included in recording media.

The recording medium stored in the sheet storage tray 302 is fed by a sheet feeding roller 303 and conveyed by a conveyance roller 306 to a registration roller 308. The recording medium stored in the sheet storage tray 304 is fed by a sheet feeding roller 305 and conveyed by conveyance rollers 307 and 306 to the registration roller 308. As illustrated in FIG. 1, sheet sensors 330 and 331 for detecting existence of a recording medium are respectively installed on an upstream side and a downstream side of the conveyance roller 307. Use of the sheet sensors 330 and 331 is described below. The sheet sensors according to the present embodiment are optical sensors, however, may be flag sensors and the like without limiting to the optical sensors.

An image signal output from the reading apparatus 202 is input to an optical scanning apparatus 311 including a semiconductor laser and a polygon mirror. A photosensitive drum 309 is charged by a charger 310 on an outer circumferential surface thereof. After the outer circumferential surface of the photosensitive drum 309 is charged, a laser beam corresponding to the image signal input from the reading apparatus 202 to the optical scanning apparatus 311 is emitted from the optical scanning apparatus 311 to the outer circumferential surface of the photosensitive drum 309 via the polygon mirror and mirror 312 and 313. Accordingly, an electrostatic latent image is formed on the outer circumferential surface of the photosensitive drum 309.

Subsequently, the electrostatic latent image is developed by a toner in a developing unit 314, and a toner image is formed on the outer circumferential surface of the photosensitive drum 309. The toner image formed on the photosensitive drum 309 is transferred to the recording medium by a transfer charger 315 installed on a position (a transfer position) facing the photosensitive drum 309. The registration roller 308 transmits the recording medium to the transfer position in accordance with a transfer timing at which the toner image is transferred by the transfer charging device 315 to the recording medium.

As described above, the recording medium on which the toner image is transferred is transmitted by a conveyance belt 317 to a fixing device 318 and heated and pressed by the fixing device 318, and thus the toner image is fixed onto the recording medium. The image forming apparatus 100 thus forms an image on a recording medium.

When an image is formed in a one-sided printing mode, a recording medium passed through the fixing device 318 is discharged to the discharge tray, which is not illustrated, by sheet discharge rollers 319 and 324. When an image is formed in a two-sided printing mode, the fixing device 318 performs fixing processing on a first surface of a recording medium, and then the recording medium is conveyed to a reversing path 325 by the sheet discharge roller 319, a conveyance roller 320, and a reversing roller 321. The recording medium is conveyed to the registration roller 308 again by conveyance rollers 322 and 323, and an image is formed on a second surface of the recording medium by the above-described method. Subsequently, the recording medium is discharged to the discharge tray, which is not illustrated, by the sheet discharge rollers 319 and 324.

When the recording medium which is subjected to the image forming on the first surface is discharged with its face down to the outside of the image forming apparatus 100, the recording medium passed through the fixing device 318 is conveyed to a direction toward the conveyance roller 320 through the sheet discharge roller 319. Subsequently, rotation of the conveyance roller 320 is reversed immediately before a rear end of the recording medium passes through a nip portion of the conveyance roller 320, and thus the recording medium is discharged with the first surface thereof face down to the outside of the image forming apparatus 100 via the sheet discharge roller 324.

Thus, the configuration and the function of the image forming apparatus 100 are described above. A load according to the present disclosure is an object driven by a motor. For example, various rollers (conveyance rollers) such as the sheet feeding rollers 204, 303, and 305, the registration roller 308, and the sheet discharge roller 319, the photosensitive drum 309, the conveyance belts 208 and 317, the illumination system 209, and the optical system are regarded as loads according to the present disclosure. The motor control apparatus according to the present embodiment can be applied to a motor which drives these loads.

Figure 2:
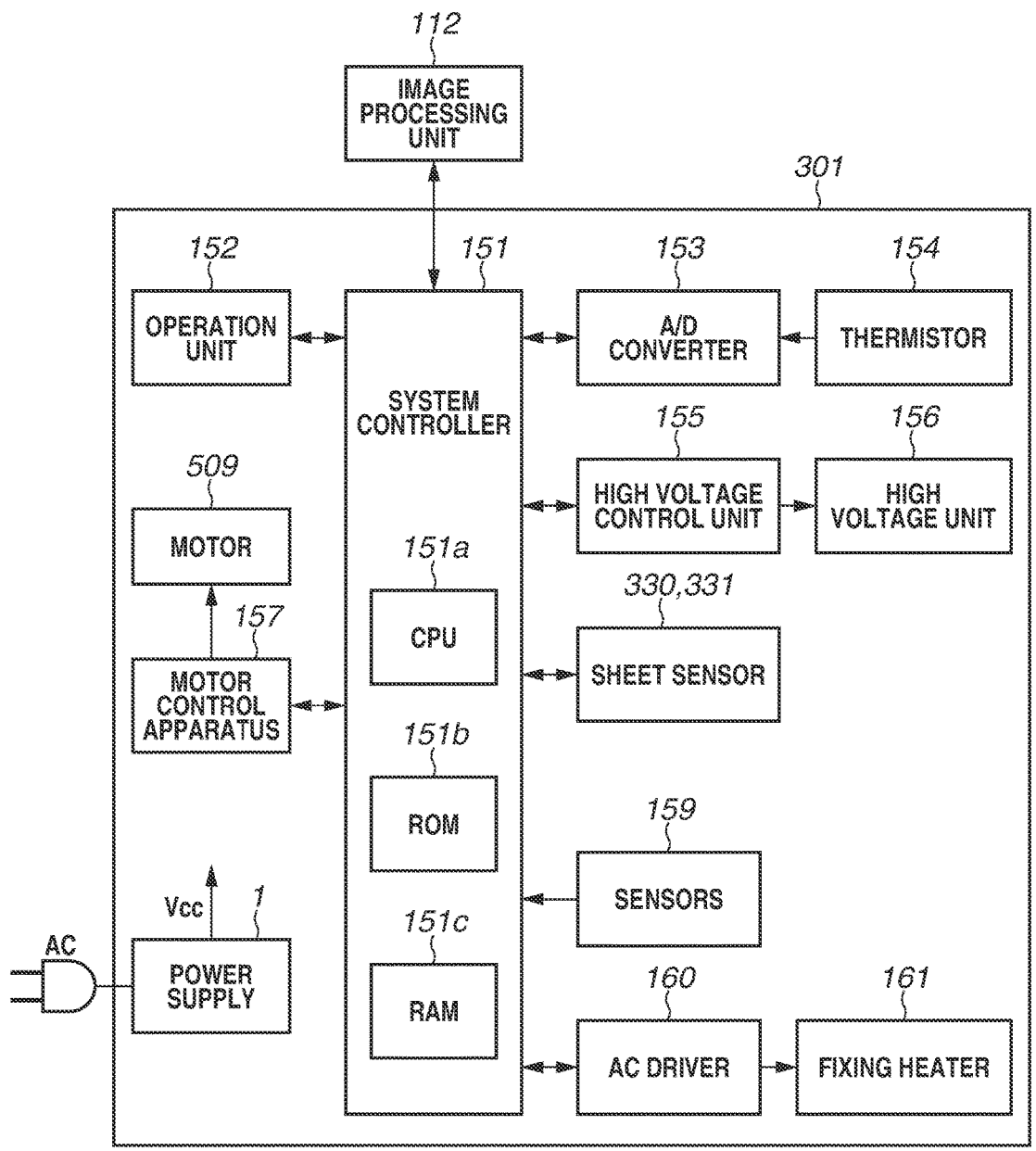
FIG. 2 is a block diagram illustrating a control configuration of the image forming apparatus.

FIG. 2 is a block diagram illustrating an example of a control configuration of the image forming apparatus 100. As illustrated in FIG. 2, the image forming apparatus 100 includes a power supply 1. The power supply 1 is connected to an alternate current (AC) power source, and each device in the image forming apparatus 100 is operated by electricity output from the power supply 1. A system controller 151 includes a central processing unit (CPU) 151a, a read-only memory (ROM) 151b, and a random access memory (RAM) 151c as illustrated in FIG. 2. The system controller 151 is connected to the image processing unit 112, an operation unit 152, an analog-to-digital (A/D) converter 153, a high voltage control unit 155, a motor control apparatus 157, the sheet sensors 330 and 331, sensors 159, and an AC driver 160. The system controller 151 can transmit and receive data and a command to and from each connected unit.

The CPU 151a reads and executes various programs stored in the ROM 151b and thus executes various sequences related to predetermined image formation sequences.

The RAM 151c is a storage device. The RAM 151c stores various data pieces, such as a setting value to the high voltage control unit 155, a command value to the motor control apparatus 157, and information pieces received from the operation unit 152.

The system controller 151 transmits, to the image processing unit 112, setting value data pieces of various apparatuses installed within the image forming apparatus 100 which are needed for image processing by the image processing unit 112. Further, the system controller 151 receives a signal from various devices (a signal from the sensors 159 and the like) and sets a setting value of the high voltage control unit 155 based on the received signal.

The high voltage control unit 155 reads the setting value set by the system controller 151 from the RAM 151c and supplies a needed voltage to high voltage units 156 (the charger 310, the developing unit 314, the transfer charger 315, and the like).

The system controller 151 controls the motor control apparatus 157 based on a detection result of the sheet sensors 330 and 331. The motor control apparatus 157 controls the motor 509 for driving the above-described load according to a command output from the CPU 151a. In FIG. 2, the motor 509 is only illustrated as a motor for driving the load, however, the image forming apparatus is actually provided with a plurality of motors. One motor control apparatus may control a plurality of motors. Further, in FIG. 2, only one motor control apparatus is provided, however, a plurality of the motor control apparatuses may be actually installed in the image forming apparatus.

The power supply 1 supplies a voltage Vcc to a full-bridge circuit 50 installed in the motor control apparatus 157. The full-bridge circuit 50 is described below.

The A/D converter 153 receives a detection signal detected by a thermistor 154 for detecting a temperature of a fixing heater 161, converts the detection signal from an analog signal to a digital signal, and transmits the digital signal to the system controller 151. The system controller 151 controls the AC driver 160 based on the digital signal received from the A/D converter 153. The AC driver 160 controls the fixing heater 161 so that a temperature of the fixing heater 161 to be a temperature needed for performing fixing processing. The fixing heater 161 is a heater used for fixing processing and is included in the fixing unit 318.

The system controller 151 controls the operation unit 152 to display an operation screen that allows a user to set a type of a recording medium to be used (a sheet type) and the like on a display unit provided in the operation unit 152. The system controller 151 receives information set by a user from the operation unit 152 and controls an operation sequence of the image forming apparatus 100 based on the information set by the user. Further, the system controller 151 transmits information indicating a state of the image forming apparatus to the operation unit 152. The information indicating the state of the image forming apparatus includes, for example, the number of image forming sheets, a progress status of an image forming operation, information regarding a jam and overlapping conveyance of sheets in the document feeding apparatus 201 and the image printing apparatus 301, and the like. The operation unit 152 displays the information received from the system controller 151 on the display unit.

The system controller 151 thus controls the operation sequence of the image forming apparatus 100 as described above.

[Motor Control Apparatus]

Next, the motor control apparatus according to the present embodiment is described. The motor control apparatus according to the present embodiment controls the motor using vector control.

<Vector Control>

First, a method for performing vector control by the motor control apparatus 157 according to the present embodiment is described with reference to FIGS. 3 and 4. The motor described below is not provided with a sensor such as a rotary encoder for detecting a rotation phase of a rotor of the motor, however, the motor may be provided with the sensor such as the rotary encoder.

Figure 3:
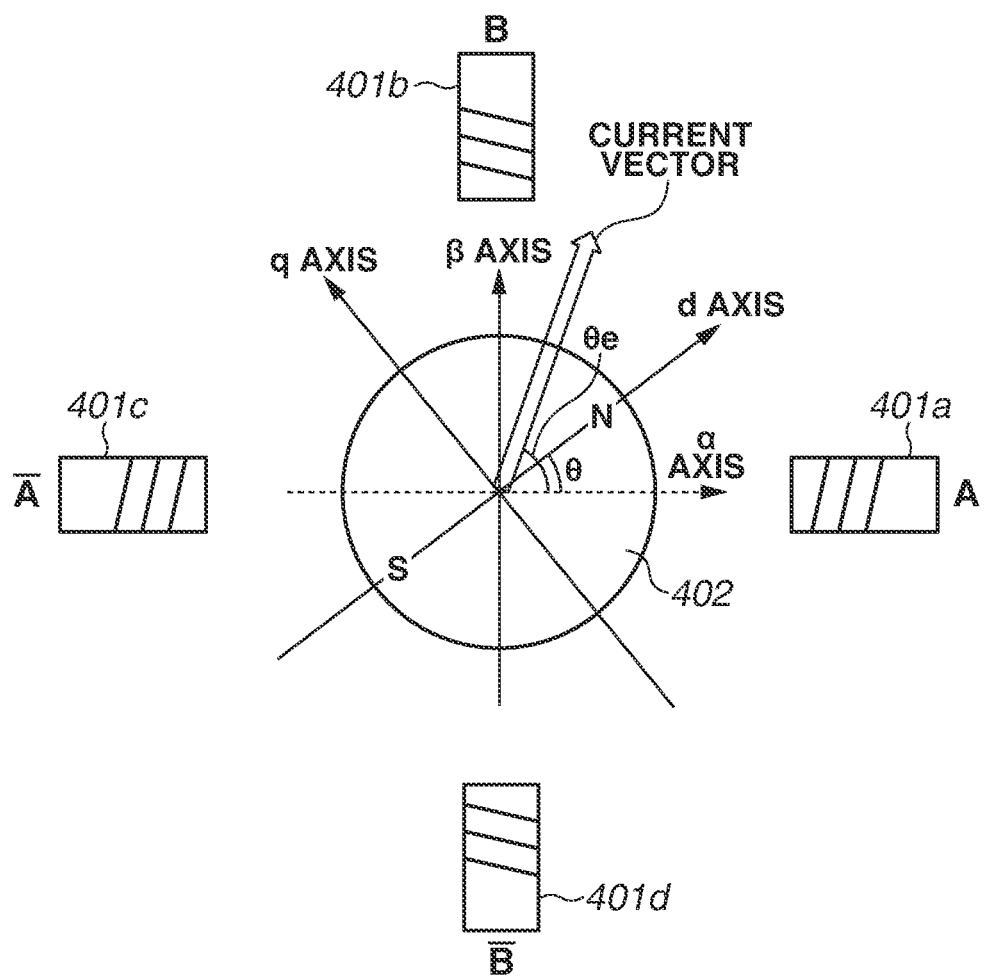
FIG. 3 illustrates a relationship between a two phase motor including an A phase and a B phase and a d axis and a q axis in a rotating coordinate system.

FIG. 3 illustrates a relationship between a stepping motor (hereinbelow, referred to as a motor) 509 consisting of two phases of an A phase (a first phase) and a B phase (a second phase) and a rotating coordinate system expressed by a d axis and a q axis. In FIG. 3, an α axis corresponding to a winding of the A phase and a β axis corresponding to a winding of the B phase are defined in a stationary coordinate system. Further, in FIG. 3, the d axis is defined along a direction of a magnetic flux generated by a magnetic pole of a permanent magnet used in a rotor 402, and the q axis is defined along a direction advanced 90 degrees counterclockwise from the d axis (a direction perpendicular to the d axis). An angle formed by the α axis and the d axis is defined as θ, and a rotation phase of the rotor 402 is expressed by a degree θ. In the vector control, the rotating coordinate system based on the rotation phase θ of the rotor 402 is used. Specifically, in the vector control, a q axis component (a torque current component) generating torque in a rotor and a d axis component (an excitation current component) affecting intensity of a magnetic flux penetrating through the winding are used. The q axis component and the d axis component are current components of a current vector corresponding to a drive current flowing through the winding in the rotating coordinate system.

The vector control is a control method for controlling a motor by performing phase feedback control which controls a torque current component value and an excitation current component value so as to reduce a deviation between a command phase representing a target phase and an actual rotation phase of a rotor. In addition, there is a control method for controlling a motor by performing speed feedback control which controls a torque current component value and an excitation current component value so as to reduce a deviation between a command speed representing a target speed and an actual rotation speed of a rotor.

Figure 4:
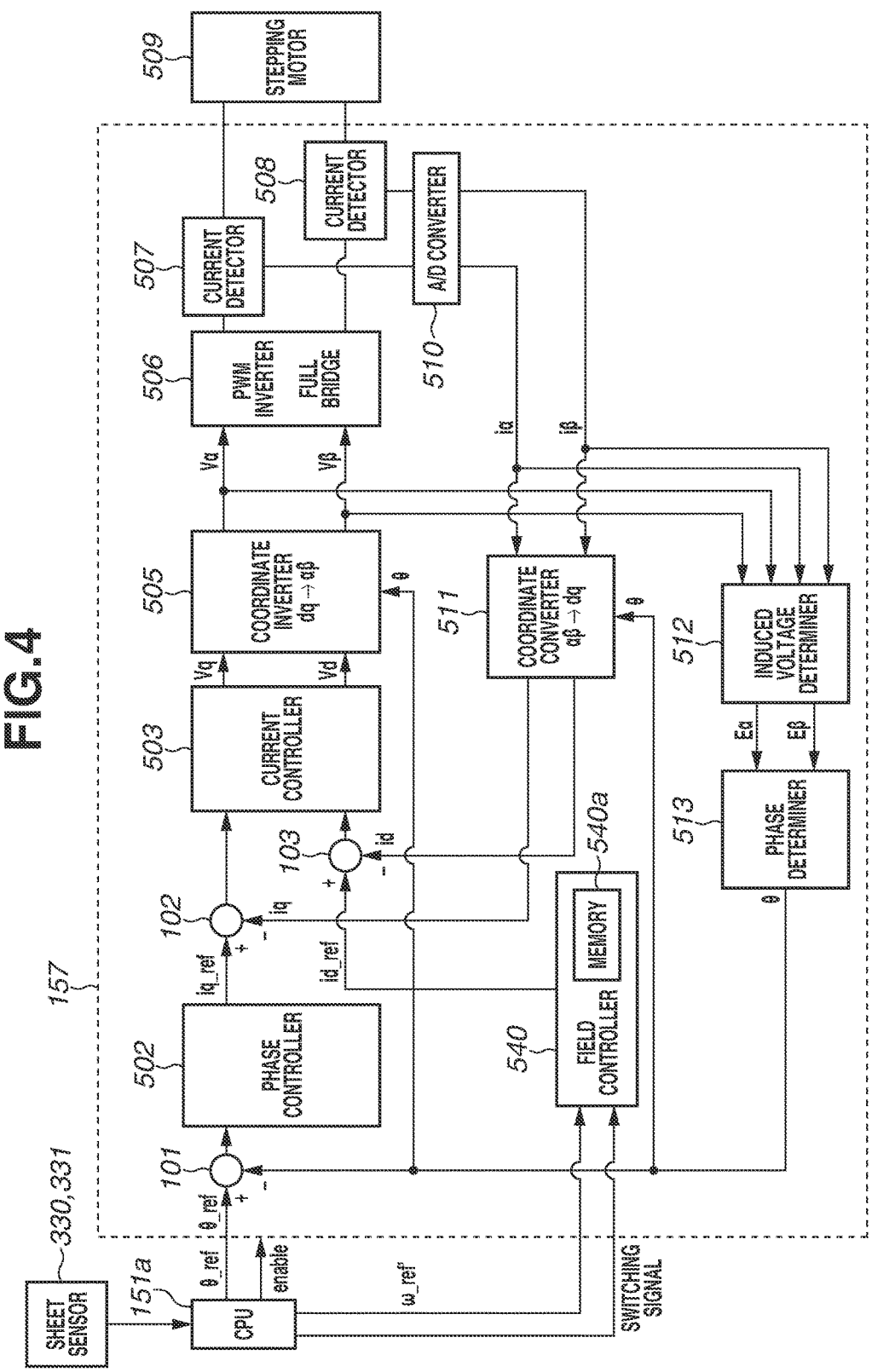
FIG. 4 is a block diagram illustrating a configuration of a motor control apparatus according to the first embodiment.

FIG. 4 is a block diagram illustrating an example of a configuration of the motor control apparatus 157 for controlling the motor 509. The motor control apparatus 157 is constituted of at least one ASIC and executes each function described below.

As illustrated in FIG. 4, the motor control apparatus 157 includes a phase controller 502, a current controller 503, a coordinate inverter 505, a coordinate converter 511, a pulse-width modulation (PWM) inverter 506 for supplying a drive current to the motor winding, and the like as circuits for performing the vector control. The coordinate converter 511 converts coordinates of the current vectors corresponding to the drive currents flowing through the windings of the A phase and the B phase of the motor 509 from the stationary coordinate system expressed by the α axis and the β axis to the rotating coordinate system expressed by the q axis and the d axis. Accordingly, the drive current flowing through the winding is expressed by a current value of the q axis component (a q axis current) and a current value of the d axis component (a d axis current) which are current values in the rotating coordinate system. The q axis current corresponds to a torque current for generating torque in the rotor 402 of the motor 509. The d axis current corresponds to an excitation current affecting intensity of a magnetic flux penetrating through the winding of the rotor 402 of the motor 509 which does not contribute to torque generation in the rotor 402. The motor control apparatus 157 can independently control each of the q axis current and the d axis current. Accordingly, the motor control apparatus 157 controls the q axis current in response to load torque in the rotor 402 and thus can efficiently generate torque needed for the rotor 402 to rotate. In other words, in the vector control, a magnitude of the current vector illustrated in FIG. 3 changes in response to the load torque in the rotor 402.

The motor control apparatus 157 determines the rotation phase θ of the rotor 402 of the motor 509 by a method described below and performs the vector control based on the determined result. The CPU 151a generates a command phase θ_ref representing a target phase of the rotor 402 of the motor 509 and outputs the command phase θ_ref to the motor control apparatus 157.

A subtractor 101 calculates a deviation between the rotation phase θ and the command phase θ_ref of the rotor 402 of the motor 509 and outputs the deviation to the phase controller 502 at a predetermined time period T (for example, 200 μs).

The phase controller 502 generates and outputs a q axis current command value iq_ref based on proportional control (P), integration control (I), and differential control (D) so as to reduce the deviation output from the subtractor 101. Specifically, the phase controller 502 generates and outputs the q axis current command value iq_ref (a target value) based on the P control, the I control, and the D control so that the deviation output from the subtractor 101 becomes zero. The P control is a control method for controlling a control target value based on a value proportional to a deviation of a command value and an estimation value. The I control is a control method for controlling a control target value based on a value proportional to time integration of a deviation of a command value and an estimation value. The D control is a control method for controlling a control target value based on a value proportional to a temporal change of a deviation of a command value and an estimation value. The phase controller 502 according to the present embodiment generates the q axis current command value iq_ref based on the PID control, however, the control method is not limited to the PID control. For example, the phase controller 502 may generate the q axis current command value iq_ref based on the PI control.

The drive currents flowing through the windings of the A phase and the B phase of the motor 509 are detected by current detectors 507 and 508 and then converted from analog values to digital values by an A/D converter 510. According to the present embodiment, a period at which the A/D converter 510 outputs a digital value is, for example, shorter (for example, 25 μs) than the period T at which the subtractor 101 outputs the deviation to the phase controller 502, however, the period is not limited to this.

Current values of the drive currents converted from the analog values to the digital values by the A/D converter 510 are expressed as current values iα and iβ in the stationary coordinate system by following formulae using a phase θe of the current vector illustrated in FIG. 3. The phase θe of the current vector is defined as an angle formed by the α axis and the current vector. "I" represents a magnitude of the current vector.

$$i\alpha = I^* \cos \theta e \tag{1}$$

$$i\beta = I^* \sin \theta e \tag{2}$$

The current values iα and iβ are input to the coordinate converter 511 and an induced voltage determiner 512.

The coordinate converter 511 converts the current values iα and iβ in the stationary coordinate system to a current value iq of the q axis current and a current value id of the d axis current in the rotating coordinate system by following formulae.

$$id = \cos \theta^* i\alpha + \sin \theta^* i\beta \tag{3}$$

$$iq = -\sin \theta^* i\alpha + \cos \theta^* i\beta \tag{4}$$

The coordinate converter 511 outputs the converted current value iq to a subtractor 102. Further, the coordinate converter 511 outputs the converted current value id to a subtractor 103.

To the subtractor 102, the q axis current command value iq_ref output from the phase controller 502 and the current value iq output from the coordinate converter 511 are input. The subtractor 102 calculates a deviation between the q axis current command value iq_ref and the current value iq and outputs the deviation to the current controller 503.

To the subtractor 103, a d axis current command value id_ref output from a field controller 540 and the current value id output from the coordinate converter 511 are input. The subtractor 103 calculates a deviation between the d axis current command value id_ref and the current value id and outputs the deviation to the current controller 503. The field controller 540 is described below.

The current controller 503 generates drive voltages Vq and Vd based on the PID control so as to reduce the deviations respectively input thereto. Specifically, the current controller 503 generates the drive voltages Vq and Vd so that the above-described deviations respectively become zero and outputs the voltages to the coordinate inverter 505. In other words, the current controller 503 functions as a voltage generation unit. The current controller 503 according to the present embodiment generates the drive voltages Vq and Vd based on the PID control, however, the control method is not limited to the PID control. For example, the current controller 503 may generate the drive voltages Vq and Vd based on the PI control.

The coordinate inverter 505 inversely converts the drive voltages Vq and Vd in the rotating coordinate system output from the current controller 503 into drive voltages Vα and Vβ in the stationary coordinate system by following formulae.

$$V\alpha = \cos \theta^* Vd - \sin \theta^* Vq \tag{5}$$

$$V\beta = \sin \theta^* Vd + \cos \theta^* Vq \tag{6}$$

The coordinate inverter 505 outputs the inversely converted drive voltages Vα and Vβ to the induced voltage determiner 512 and the PWM inverter 506.

Figure 5:
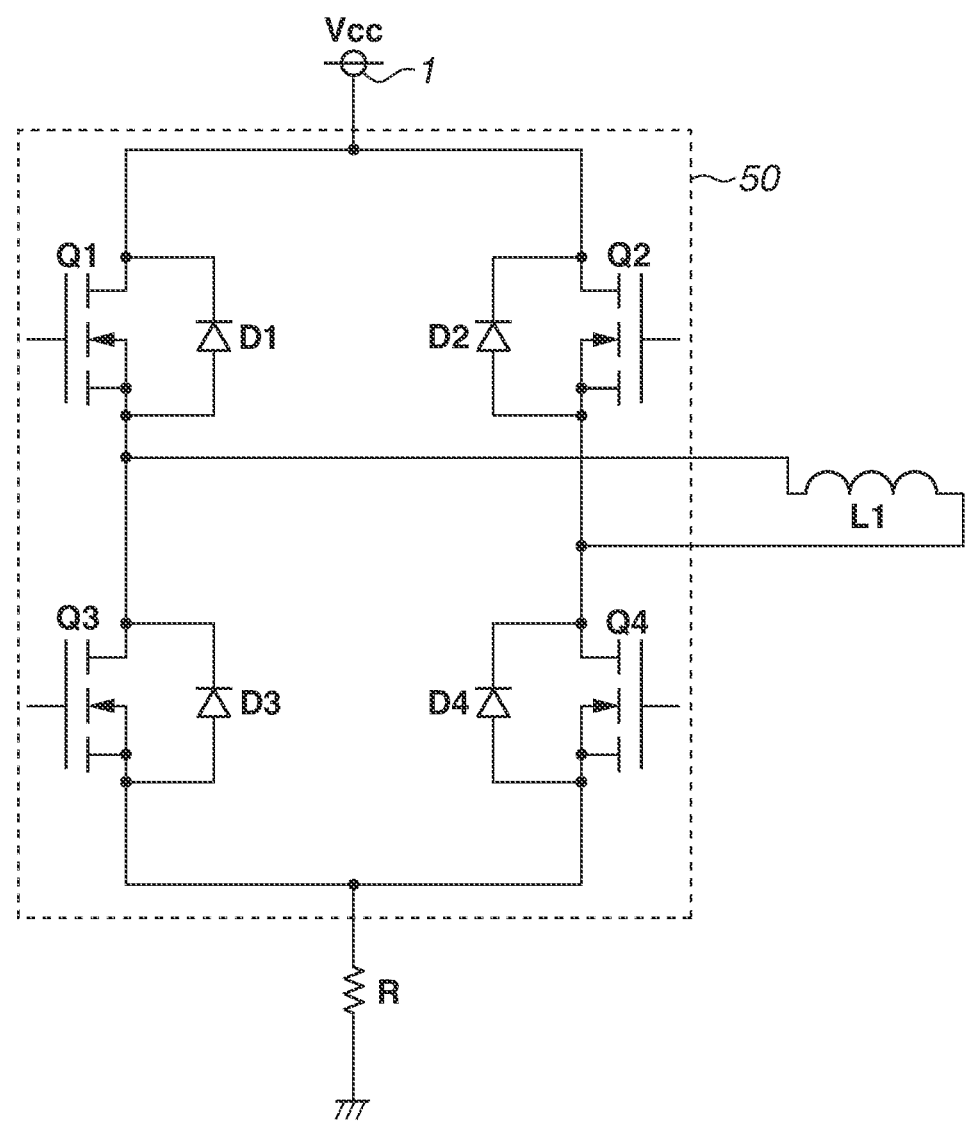
FIG. 5 illustrates a configuration of a full-bridge circuit installed in a pulse-width modulation (PWM) inverter.

The PWM inverter 506 includes a full bridge circuit. FIG. 5 illustrates an example of a configuration of the full-bridge circuit 50 installed in the PWM inverter 506. As described above, the full-bridge circuit 50 is supplied with the voltage Vcc from the power supply 1. The full-bridge circuit 50 includes field effect transistors (FETs) Q1 to Q4 as switching elements. In addition, the full-bridge circuit 50 is connected to a winding L1 of the motor 509.

The FETs Q1 to Q4 are driven by PWM signals based on the drive voltages Vα and Vβ input from the coordinate inverter 505. Thus, the winding L1 is applied with a voltage from the power supply 1. Accordingly, the winding L1 is supplied with the drive currents iα and iβ corresponding to the drive voltages Vα and Vβ. In other words, the PWM inverter 506 functions as a current supply unit. According to the present embodiment, the PWM inverter includes the full bridge circuit, however, the PWM inverter may include a half bridge circuit and the like. The full bridge circuits are provided respectively corresponding to the A phase and the B phase of the motor 509. According to the present embodiment, the power supply is provided one each to the A phase and the B phase, however, the present embodiment is not limited to this configuration. Further, in FIGS. 4 and 5, the winding of the motor is illustrated as if it is provided inside of the motor control apparatus 157, however, the winding is actually provided in the motor 509. In other words, the winding is provided outside of the motor control apparatus 157.

Next, a method for determining the rotation phase θ is described. For determination of the rotation phase θ of the rotor 402, values of induced voltages Eα and Eβ are used which are induced in the windings of the A phase and the B phase of the motor 509 by rotation of the rotor 402. Values of induced voltages are determined (calculated) by the induced voltage determiner 512. Specifically, the induced voltages Eα and Eβ are determined by following formulae based on the current values iα and iβ input from the A/D converter 510 to the induced voltage determiner 512 and the drive voltages Vα and Vβ input from the coordinate inverter 505 to the induced voltage determiner 512.

$$E\alpha = V\alpha - R^* i\alpha - L^* di\alpha/dt \qquad (7)$$

$$E\beta = V\beta - R^* i\beta - L^* di\beta/dt \qquad (8)$$

Here, R represents a winding resistance, and L represents a winding inductance. Values of the winding resistance R and the winding inductance L are specific to the motor 509 to be used and stored in advance in the ROM 151*b* or a memory (not illustrated) installed in the motor control apparatus 157.

The induced voltages Eα and Eβ determined by the induced voltage determiner 512 are output to the phase determiner 513.

The phase determiner 513 determines the rotation phase θ of the rotor 402 of the motor 509 by a following formula based on a ratio of the induced voltage Eα and the induced voltage Eβ output from the induced voltage determiner 512.

$$\theta = \tan^{-1}(-E\beta/E\alpha) \qquad (9)$$

According to the present embodiment, the phase determiner 513 determines the rotation phase θ by calculation based on the formula (9), however, the determination method is not limited to the above-described one. For example, the phase determiner 513 may determine the rotation phase θ by referring to a table indicating relationships of the induced voltage Eα and the induced voltage Eβ and the rotation phase θ corresponding to the induced voltage Eα and the induced voltage Eβ stored in the ROM 151*b* and the like.

The rotation phase θ of the rotor 402 obtained as described above is input to the subtractor 101, the coordinate inverter 505, and the coordinate converter 511.

The motor control apparatus 157 repeats the above-described control.

As described above, the motor control apparatus 157 according to the present embodiment performs the vector control for controlling the current value in the rotating coordinate system so as to reduce the deviation between the command phase θ_ref and the rotation phase θ. Performing the vector control can suppress a step-out state of the motor and increase of motor sound and power consumption due to surplus torque. Further, the phase feedback control is performed, and thus the rotation phase of the rotor is controlled to be a desired phase. Therefore, the vector control by the phase feedback control is applied to the motor for driving the load (for example, the registration roller and the like) needed to be accurately control the rotation phase so as to appropriately perform image forming on a recording medium in the image forming apparatus, and thus image forming on the recording medium is appropriately performed.

[Field Weakening]

Next, field weakening is described. As described above, an induced voltage is generated in the winding of each phase of the motor by rotation of the rotor. When the induced voltage is generated in the winding of the motor, a voltage which can be applied to the winding of the motor (hereinbelow, referred to as an available voltage) is reduced. Specifically, for example, when a voltage value output from the power supply 1 is Vcc, available voltages Vα' and Vβ' are limited to values expressed by following formulae (10) and (11) because an induced voltage is generated in the winding of each phase.

$$V\alpha' = Vcc - e\alpha \qquad (10)$$

$$V\beta' = Vcc - e\beta \qquad (11)$$

Here, eα represents an amplitude of an induced voltage Eα which changes in a sine wave shape. Further, eβ represents an amplitude of an induced voltage Eβ which changes in a sine wave shape.

In addition, an amplitude e of an induced voltage generated in the winding of each phase by rotation of the rotor is larger as the rotation speed of the rotor is faster. In other words, as the rotation speed of the rotor is faster, the available voltage is reduced. If the available voltage is reduced, torque can be applied to the rotor (hereinbelow, referred to as torque T) is also reduced.

An induced voltage is generated in accordance with a change in a magnetic flux penetrating through the winding. Therefore, an excitation current component is controlled so that a magnetic flux weaker than the magnetic flux of the rotor penetrates through the winding, and thus the magnitude of the induced voltage generated in the winding can be suppressed from increasing. Specifically, the excitation current component is controlled to be a negative value, and the magnitude of the magnetic flux of the rotor is apparently weakened, so that the magnetic flux weaker than the magnetic flux of the rotor can penetrate through the winding. Accordingly, the magnitude of the induced voltage generated in the winding can be suppressed from increasing, and the available voltages Vα' and Vβ' can be suppressed from being reduced. Accordingly, the torque T can be suppressed from being reduced. The above-described method is referred to as field weakening. As the excitation current component is a negative value, and an absolute value thereof is larger, the torque T can be more efficiently suppressed from being reduced.

As described above, the load torque in the period in which the conveyance rollers nip a recording medium is larger than the load torque in the period in which the conveyance rollers do not nip a recording medium in the period in which the rotor rotates at the predetermined speed. Therefore, a value of the excitation current component is set so that the load torque in the period in which the conveyance rollers nip a recording medium does not exceed the torque T.

As an absolute value of a value of the excitation current component is larger, a current supplied to the winding of the motor is increased. Therefore, when a value of the excitation current component is set so that the load torque in the period in which the conveyance rollers nip a recording medium does not exceed the torque T, an unnecessary current is supplied to the winding in the period in which the conveyance rollers do not nip a recording medium. Accordingly, power consumption is increased.

Thus, according to the present embodiment, a configuration described below is applied to the motor control apparatus 157, and thus motor control can be efficiently performed.

<First Condition for Performing Field Weakening>

Next, field weakening according to the present embodiment is described. According to the present embodiment, the motor control apparatus 157 performs field weakening when following two conditions are satisfied.

A first condition for performing field weakening is described.

Figure 6:
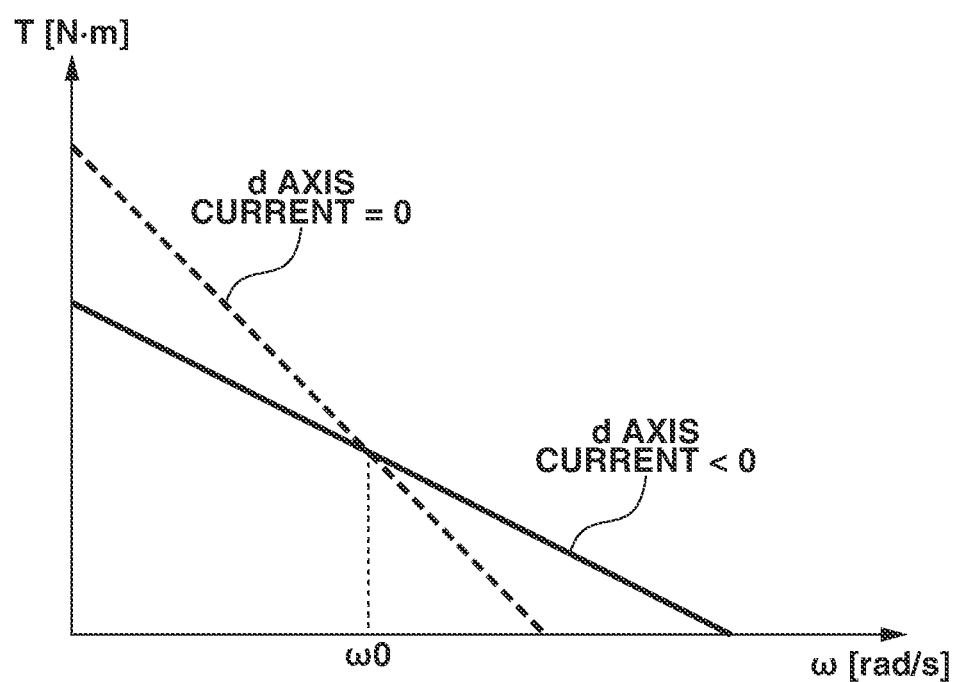
FIG. 6 illustrates a relationship between outputtable torque and the number of rotations of a rotor.

FIG. 6 illustrates a relationship between torque T and a rotation speed ω of the rotor. FIG. 6 illustrates a torque T-rotation speed ω characteristic (dashed line) in the case that the d axis current is controlled to be zero and a torque T-rotation speed ω characteristic (solid line) in the case that the d axis current is controlled to be a negative value. The torque-rotation speed characteristics illustrated in FIG. 6 are examples according to the present embodiment and not limited to them.

As illustrated in FIG. 6, when the rotation speed ω is smaller than ω0(ω<ω0), the torque T in the case that the d axis current is controlled to be zero is larger than the torque T in the case that the d axis current is controlled to be a negative value. In other words, when the rotation speed ω is smaller than ω0 (ω<ω0), the rotor can be applied with larger torque when the field weakening is not performed than when the field weakening is performed.

Further, as illustrated in FIG. 6, when the rotation speed ω is larger than ω0 (ω>ω0), the torque T in the case that the d axis current is controlled to be a negative value is larger than the torque T in the case that the d axis current is controlled to be zero. In other words, when the rotation speed ω is larger than ω0 (ω>ω0), the rotor can be applied with larger torque when the field weakening is performed than when the field weakening is not performed.

As described above, when the rotation speed ω is smaller than ω0 (ω<ω0), the rotor can be applied with larger torque when the field weakening is not performed than when the field weakening is performed. Further, when the rotation speed ω is larger than ω0 (ω>ω0), the rotor can be applied with larger torque when the field weakening is performed than when the field weakening is not performed.

Therefore, according to the present embodiment, the fact that the rotation speed of the rotor is greater than or equal to ω0 is the first condition for performing the field weakening.

As illustrated in FIG. 4, the CPU 151*a* according to the present embodiment calculates a rotation speed ω_ref' in place of a command speed ω_ref using a following formula (12) based on the command phase θ_ref and outputs the rotation speed ω_ref' to the field controller 540.

$$\omega = d\theta/dt \quad (12)$$

The field controller 540 discriminates (determines) whether the rotation speed ω_ref' satisfies a following formula (13). A speed threshold value ωth (=ω0) is stored in a memory 540*a*.

$$\omega\_ref' > \omega th \quad (13)$$

However, when only the formula (13) is regarded as the condition for performing the field weakening, an unnecessary current is supplied to the winding in the period in which the conveyance rollers do not nip a recording medium as described above. Accordingly, power consumption is increased.

<Second Condition for Performing Field Weakening>

Next, a second condition for performing field weakening is described.

As described above, the load torque in the period in which the conveyance rollers nip a recording medium is larger than the load torque in the period in which the conveyance rollers do not nip a recording medium in the period in which the rotor rotates at the predetermined speed. In other words, the torque T in the period in which the conveyance rollers nip a recording medium requires to be larger than the torque T in the period in which the conveyance rollers do not nip a recording medium.

Figure 7:
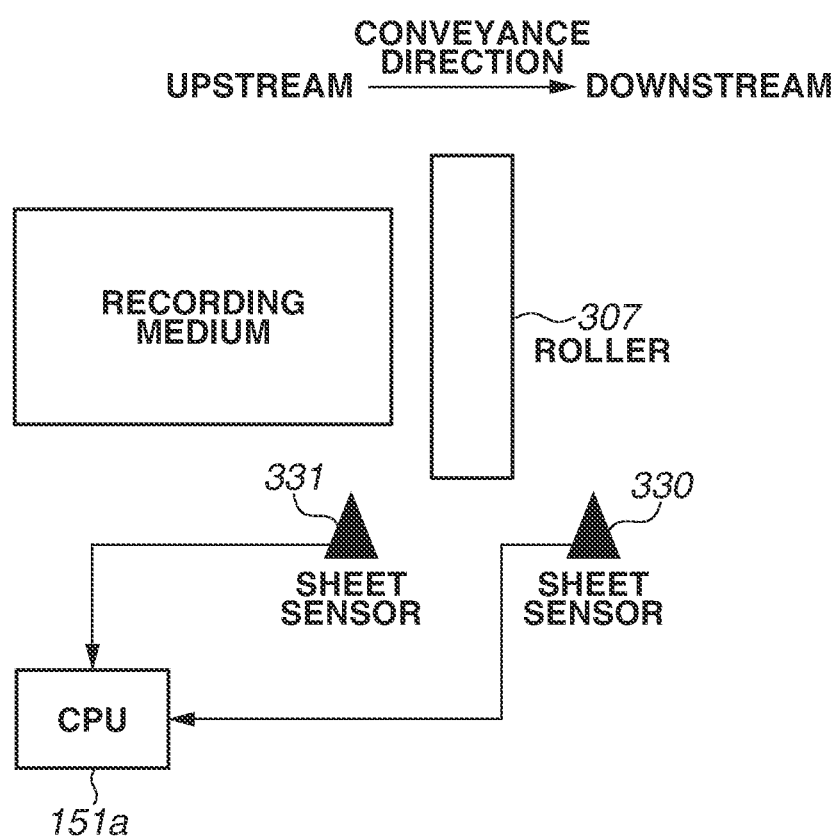
FIG. 7 illustrates a period in which field weakening is performed.

FIG. 7 illustrates a period in which the field weakening is performed. As described with reference to FIG. 1, the sheet sensor 331 for detecting existence of a recording medium is disposed on a predetermined position on an upstream side of the conveyance roller 307 in a conveyance direction to which the recording medium is conveyed. Further, the sheet sensor 330 for detecting existence of a recording medium is disposed on a second predetermined position on a downstream side of the conveyance roller 307 in the conveyance direction. Detection results of the sheet sensors 330 and 331 are input to the CPU 151*a*. According to the present embodiment, the field weakening is started when the sheet sensor 331 detects a leading edge of a recording medium. In addition, the field weakening is terminated when a trailing edge of the recording medium passes through the sheet sensor 330 (when the sheet sensor 330 stops detecting the recording medium). In other words, the field weakening is performed only in the period in which the conveyance rollers nip a recording medium, and the field weakening is not performed in the period in which the conveyance rollers do not nip a recording medium. Accordingly, increase of power consumption due to the fact that the excitation current component is set to a value other than zero can be suppressed.

<Specific Method for Performing Field Weakening>

Next, a specific method for performing field weakening is described.

Figure 8:
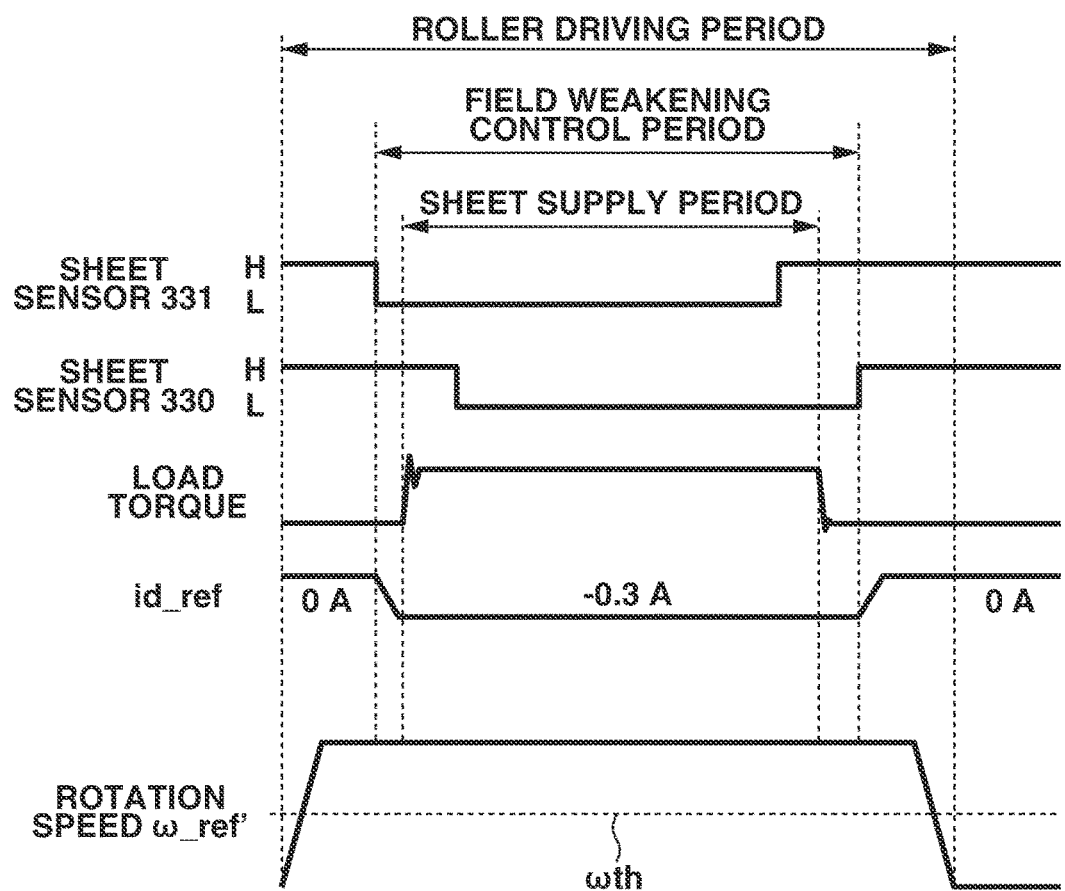
FIG. 8 illustrates a time chart of field weakening control according to the first embodiment.

FIG. 8 illustrates a time chart of field weakening control according to the present embodiment. The field controller 540 outputs 0 A as a d axis current command value in a period until when the sheet sensor 331 detects a leading edge of a recording medium (a period in which the sheet sensor 331 is in an 'H' state) in a period in which the rotation speed of the rotor ω_ref' is greater than or equal to the speed threshold value ωth. In other words, the field weakening is not performed.

Subsequently, when the sheet sensor 331 detects the leading edge of the recording medium (when the sheet sensor 331 changes from the 'H' state to an 'L' state) in a state in which the rotation speed ω_ref' is at the predetermined speed, the CPU 151*a* outputs a switching signal for switching a value of the d axis current command value to the field controller 540. The field controller 540 switches the d axis current command value id_ref to a negative value (for example, −0.3 A) by gradually changing from 0 A in response to the switching signal. Accordingly, the field weakening is performed. The d axis current command value id_ref is set to a predetermined value so that the load torque does not exceed the torque T even if a recording medium (for example, thick paper) of which an increase range of load torque is the largest in types of conveyable recording media is conveyed. If the set id_ref value is a negative value and an absolute value thereof is too large, a magnetic field generated by a permanent magnet as the rotor is excessively weakened, and accordingly, the torque generated in the rotor is reduced. Further, if the set id_ref value is a negative value and an absolute value thereof is close to zero, the magnetic field generated by the permanent magnet as the rotor cannot be weakened, and accordingly, the induced voltage generated in the winding cannot be reduced. The negative value is determined in advance based on an experiment and the like in consideration of the above-described matters. The d axis current command value id_ref is stored in the memory 540a, the field controller 540 outputs the value stored in the memory 540a as the d axis current command value id_ref.

When the leading edge of the recording medium enters a nip portion of the conveyance roller 307, and the recording medium is conveyed by the conveyance roller 307, the sheet sensor 330 detects the leading edge of the recording medium (the sheet sensor 330 changes from the 'H' state to the 'L' state). When the recording medium is further conveyed, and the trailing edge of the recording medium passes through the sheet sensor 330 (the sheet sensor 330 changes from the 'L' to the 'H' state), the CPU 151a outputs the switching signal to the field controller 540. The field controller 540 switches the d axis current command value id_ref to 0 A by gradually changing from the negative value (for example, −0.3 A) in response to the switching signal. Accordingly, the field weakening is terminated. According to the present embodiment, the field controller 540 gradually changes the d axis current command value id_ref, however, for example, the field controller 540 may directly switch the d axis current command value id_ref from 0 A to −3 A. In addition, the field controller 540 may directly switch the d axis current command value id_ref from −3 A to 0 A.

When driving of the conveyance roller 307 is restarted, the field controller 540 outputs 0 A as the d axis current command value id_ref. Subsequently, the CPU 151a performs the field weakening control by the above-described method. Further, when driving of the conveyance roller 307 is stopped in a state in which the recording medium is nip in the nip portion of the conveyance roller 307, the driving of the conveyance roller 307 is stopped in a state in which the d axis current command value output from the field controller 540 is set to the negative value. In this case, the CPU 151a outputs a switching signal to the field controller 540 when the driving of the conveyance roller 307 is restarted. Accordingly, the driving of the conveyance roller 307 can be restarted in a state in which the field controller 540 outputs 0 A as the d axis current command value.

The sheet sensor 331 is disposed at a position at which the d axis current command value can be switched in a period from when the leading edge of the recording medium is detected to when the leading edge of the recording medium enters the nip portion of the conveyance roller 307 and a position as close to the conveyance roller 307 as possible. The sheet sensor 330 is disposed at a position as close to the conveyance roller 307 as possible. Accordingly, a period in which the field weakening is performed can be as short as possible, and increase of power consumption can be suppressed.

Figure 9:
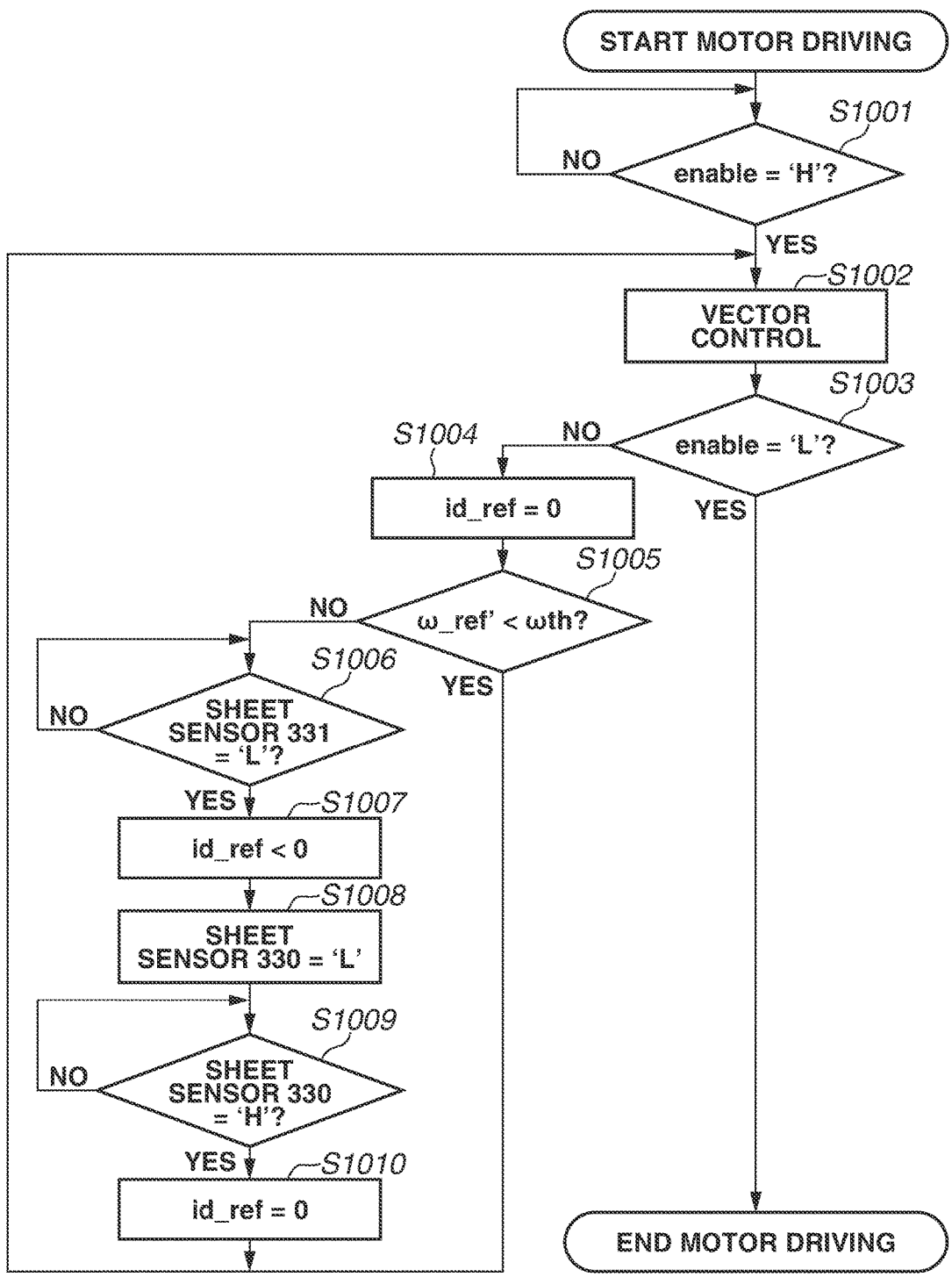
FIG. 9 is a flowchart illustrating a method for performing field weakening control according to the first embodiment.

FIG. 9 is a flowchart illustrating a method for performing the field weakening control. The method for performing the field weakening control is described below with reference to FIG. 9. Processing in the flowchart is executed by the CPU 151a.

First, in step S1001, in the case that the CPU 151a outputs an enable signal 'H' to the motor control apparatus 157 (YES in step S1001), the motor control apparatus 157 starts driving control of the motor 509 based on a command output from the CPU 151a. An enable signal is a signal for permitting or prohibiting an operation of the motor control apparatus 157. In the case that the enable signal is 'L (low level)', the CPU 151a prohibits the operation of the motor control apparatus 157. In other words, the control of the motor 509 by the motor control apparatus 157 is terminated. Further, in the case that the enable signal is 'H (high level)', the CPU 151a permits the operation of the motor control apparatus 157, and the motor control apparatus 157 controls driving of the motor 509 based on the command output from the CPU 151a.

Next, in step S1002, the motor control apparatus 157 performs the vector control based on a command output from the CPU 151a. Subsequently, in step S1003, in the case that the CPU 151a outputs an enable signal 'L' to the motor control apparatus 157 (YES in step S1003), the motor control apparatus 157 terminates driving of the motor 509. In step S1003, in the case that the CPU 151a output the enable signal 'H' to the motor control apparatus 157 (NO in step S1003), the motor control apparatus 157 advances the processing to step S1004.

Subsequently, in step S1004, the field controller 540 outputs 0 A as the d axis current command value id_ref. In other words, the field weakening is not performed.

Next, in step S1005, in the case that the rotation speed ω_ref is less than the speed threshold value ωth (YES in step S1005), the processing returns again to step S1002, and the vector control is continued. The field weakening is not performed.

In step S1005, in the case that the rotation speed ω_ref is greater than or equal to the speed threshold value ωth (NO in step S1005), the processing proceeds to step S1006.

In step S1006, when the sheet sensor 331 detects the leading edge of the recording medium (YES in step S1006), then in step S1007, the CPU 151a outputs a switching signal to the field controller 540. The field controller 540 switches the output d axis current command value id_ref from 0 A to a negative value (for example, −0.3 A) in response to the switching signal. Accordingly, the field weakening is performed.

Subsequently, the recording medium is conveyed by the conveyance roller 307, and in step S1008, the sheet sensor 330 detects the leading edge of the recording medium. The recording medium is further conveyed, and in step S1009, in the case that the trailing edge of the recording medium passes through the sheet sensor 330 (YES in step S1009), in step S1010, the CPU 151a outputs the switching signal to the field controller 540. The field controller 540 switches the output d axis current command value id_ref from the negative value (for example, −0.3 A) to 0 A in response to the switching signal. Accordingly, the field weakening is terminated. Then, the processing returns again to step S1002, and the vector control is continued.

Subsequently, the motor control apparatus 157 repeats the above-described control and controls the motor 509 until the CPU 151a outputs the enable signal 'L' to the motor control apparatus 157.

As described above, according to the present embodiment, the field weakening is performed only in a period needed for performing the field weakening. Specifically, the field weakening is performed only in the period in which the conveyance rollers nip a recording medium in a period in which the rotation speed ω_ref is the predetermined speed greater than or equal to the speed threshold value ωth. According to the present embodiment, it is determined in advance by a sequence of an image formation operation that the leading edge of the recording medium reaches the nip portion of the conveyance roller, and the trailing edge of the recording medium passes through the nip portion in a state in which the rotation speed of the rotor is the predetermined speed. In other words, it is determined in advance by the sequence of the image formation operation that the recording medium is not nipped by the conveyance rollers during acceleration or deceleration of the rotor. Therefore, according to the present embodiment, the d axis current command value id_ref is zero in a period in which the rotation speed of the rotor is slower than the predetermined speed, namely a period when the rotor is being accelerated or decelerated. Accordingly, a period in which the field weakening is performed can be shortened in a period in which the conveyance roller is driven, and increase of power consumption can be suppressed. In other words, increase of power consumption due to the fact that a predetermined d axis current value corresponding to the predetermined speed is set in the period in which the rotor rotates at the predetermined speed can be suppressed.

According to the present embodiment, the d axis current command values id_ref stored in the memory 540a are 0 A and −3.0 A, however, three or more values may be stored therein. In this case, for example, the CPU 151a outputs a signal indicating which value is used to the field controller 540, and the field controller 540 switches the output d axis current command value id_ref in response to the signal.

Further, according to the present embodiment, driving of the conveyance roller 307 is stopped when a trailing edge of a recording medium passes through the nip portion of the conveyance roller 307, however, the present embodiment is not limited to this configuration. For example, it may be configured to stop driving of the conveyance roller 307 when a recording medium conveyed by the conveyance roller 307 begins to be conveyed by a conveyance roller disposed on a downstream side of the conveyance roller 307. In other words, driving of the conveyance roller 307 may be stopped in a state in which the recording medium is nipped in the nip portion of the conveyance roller 307. In this case, the conveyance roller 307 is rotated together with the recording medium conveyed by the conveyance roller disposed on the downstream side of the conveyance roller 307. According to the present embodiment, a method for stopping driving of the motor 509 is used to stop driving of the conveyance roller 307, however, a method for disengaging a clutch so as not to transmit a driving force of the motor 509 to the conveyance roller 307 may be used.

Regarding an image forming apparatus and a motor control apparatus according to a second embodiment, configurations thereof which are similar to those of the first embodiment are omitted from the description.

According to the first embodiment, when the field weakening is performed, the d axis current command value id_ref is set to a predetermined value (−3.0 A) so that the load torque does not exceed the torque T even if a recording medium of which an increase range of load torque is the largest in types of conveyable recording media is conveyed.

An increase range of load torque in the rotor when a leading edge of a recording medium enters the nip portion of the conveyance roller and load torque in the rotor when the recording medium is conveyed are different depending on a sheet type. Specifically, for example, the load torque in the rotor when plain paper is conveyed is smaller than the load torque in the rotor when thick paper is conveyed.

Therefore, if the d axis current command value id_ref is set based on a recording medium of which an increase range of load torque is the largest, for example, when plain paper is conveyed, a current larger than a magnitude of the d axis current originally required for conveying the plain paper may be supplied to the winding. In other words, there is a possibility that power consumption is increased.

Thus, according to the present embodiment, a value of the d axis current command value id_ref is changed in response to a sheet type. The conditions for performing the field weakening are similar to those described in the first embodiment, and thus the description thereof is omitted.

Figure 10:
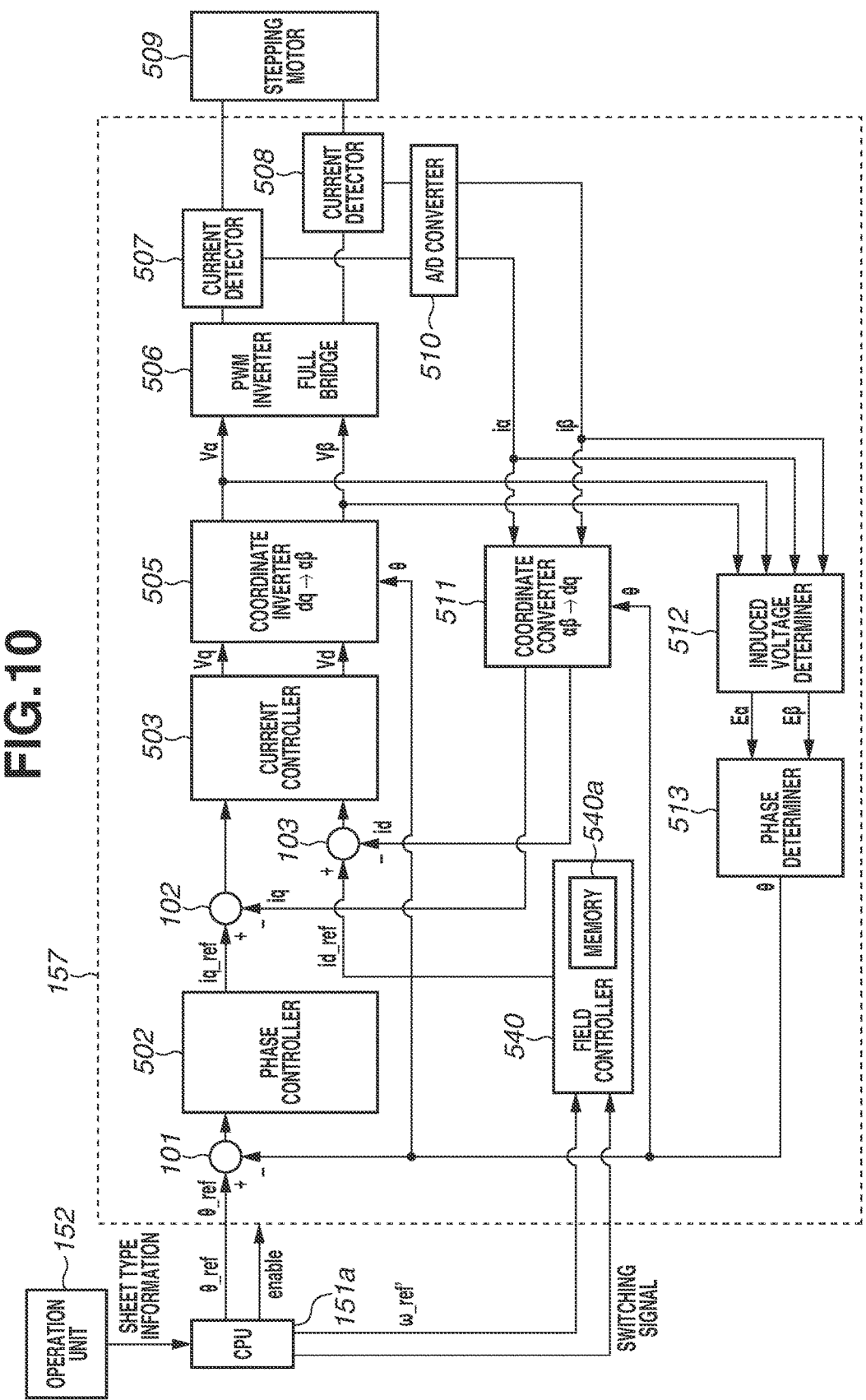
FIG. 10 is a block diagram illustrating a configuration of a motor control apparatus according to a second embodiment.

FIG. 10 is a block diagram illustrating a configuration of the motor control apparatus 157 according to the present embodiment.

According to the present embodiment, the field controller 540 includes the memory 540a for storing a correspondence relationship of a sheet type and a d axis current command value id_ref. As a basis weight of a recording medium is larger, the d axis current command value id_ref is a negative value and an absolute value thereof becomes a larger value. Specifically, for example, the d axis current command value id_ref corresponding to plain paper is set to −2.0 A, and the d axis current command value id_ref corresponding to thick paper is set to −4.0 A. The correspondence relationship of the sheet type and the d axis current command value id_ref is determined in advance based on an experiment and the like As described with reference to FIG. 2, the CPU 151a receives sheet type information set by a user from the operation unit 152. The CPU 151a outputs the received sheet type information to the field controller 540. The field controller 540 determines (switches) the d axis current command value id_ref based on the received sheet type information and the correspondence relationship.

As described above, according to the present embodiment, the d axis current command value id_ref is changed in response to the sheet type. Accordingly, the present embodiment can suppress the load torque in the rotor from exceeding the torque T in spite of performing the field weakening and power consumption from being increased due to the fact that a current larger than a needed d axis current is supplied to the winding.

According to the first and the second embodiments, the field weakening control is performed based on detection results of the sheet sensors 330 and 331, however, the embodiments are not limited to this configuration. For example, the field weakening may be started when a predetermined time length T1 which is from a start of the driving of the conveyance roller 307 to a predetermined timing before the leading edge of the recording medium enters the nip portion of the conveyance roller 307 elapses. Further, the field weakening may be terminated when a predetermined time length T2 which is from the start of the driving of the conveyance roller 307 to a predetermined timing after the trailing edge of the recording medium passes through the nip portion of the conveyance roller 306 elapses. The above-described predetermined timings are determined based on the operation sequence of the image forming apparatus which is set in advance. The above-described predetermined timings may be determined based on a pulse number output to the motor.

According to the first and the second embodiments, the value of the d axis current command value id_ref is a value obtained in advance by an experiment and the like, however, the value is not limited to this. For example, the field controller 540 may be configured to change the d axis current command value id_ref based on the rotation speed of the rotor $\omega\_ref$. Specifically, the field controller 540 may set a smaller value to the d axis current command value id_ref as the rotation speed $\omega\_ref$ larger. Accordingly, the induced voltage generated in the winding can be suppressed from becoming larger with the increase of the rotation speed.

According to the first and the second embodiments, the d axis current command value is set to 0 A in the period in which the conveyance rollers do not nip a recording medium in the period in which the rotation speed of the rotor is the predetermined speed greater than or equal to the speed threshold value, however, the d axis current command value may be set to a value other than 0 A. Specifically, the d axis current command value in the period in which the conveyance rollers do not nip a recording medium may be larger than a negative value as the d axis current command value which is set in period in which the conveyance rollers nip a recording medium in the period in which the rotation speed of the rotor is the predetermined speed greater than or equal to the speed threshold value. In other words, the magnetic flux penetrating through the winding in the period in which the conveyance rollers do not nip a recording medium may be stronger than the magnetic flux penetrating through the winding in the period in which the conveyance rollers nip a recording medium in the period in which the rotation speed of the rotor is the predetermined speed greater than or equal to the speed threshold value. However, increase of power consumption can be efficiently suppressed by setting a value as close to 0 A as possible.

The d axis current command value when the field weakening is performed is set to a value with which the rotation phase of the rotor can be accurately determined even if the induced voltage generated in the winding is reduced by the field weakening.

The configuration of the field weakening control described in the first and the second embodiments can be applied not only to the conveyance roller 307 but also other rollers (for example, the conveyance rollers 306, 322 and others).

According to the first and the second embodiments, the speed threshold value ωth is set to ω0 but not limited to this. For example, the speed threshold value ωth may be set to a value smaller than ω0 or a value larger than ω0.

According to the first and the second embodiments, a stepping motor is used as a motor for driving a load, however, another motor such as a direct-current (DC) motor may be used. Further, a motor may be not only a two-phase motor but also a three-phase motor and other motors.

According to the first and the second embodiments, a permanent magnet is used as the rotor, however, the rotor is not limited to a permanent magnet.

Figure 11:
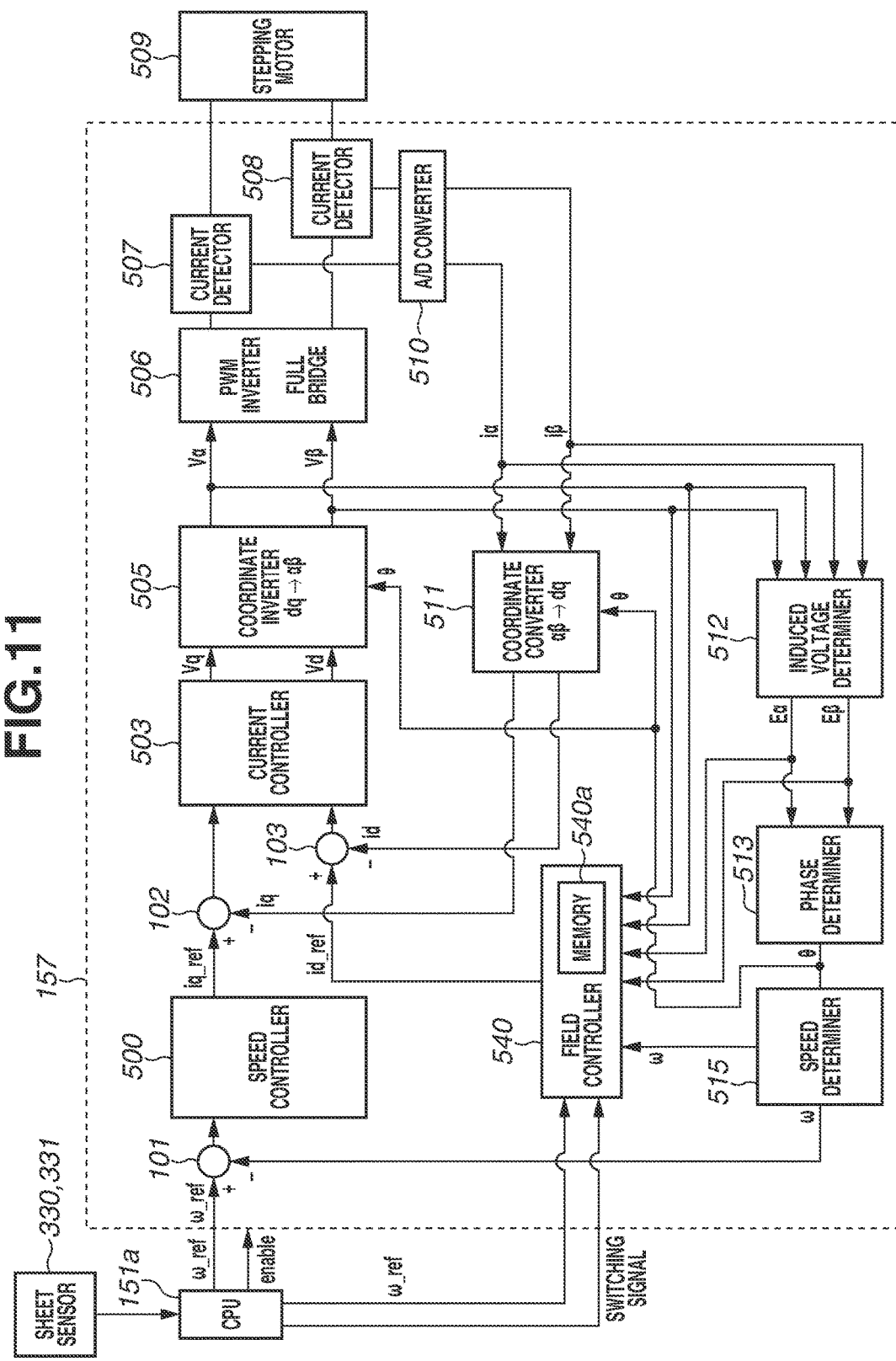
FIG. 11 is a block diagram illustrating a configuration of a motor control apparatus for performing speed feedback control.

The vector control according to the first to the second embodiments controls the motor by performing the phase feedback control, however, the control is not limited to the phase feedback control. For example, the motor may be controlled by feeding back the rotation speed ω of the rotor 402. Specifically, as illustrated in FIG. 11, the motor control apparatus includes a speed determiner 514 therein, and the speed determiner 514 determines the rotation speed ω based on a temporal change of the rotation phase θ output from the phase determiner 513. The formula (12) is used to determine the speed.

The CPU 151a outputs a command speed ω_ref representing a target speed of the rotor. Further, the motor control apparatus includes a speed controller 500 therein, and the speed controller 500 generates and outputs the q axis current command value iq_ref so as to reduce a deviation between the rotation speed ω and the command speed ω_ref. The motor may be controlled by performing such speed feedback control.

According to the present disclosure, a target value of the excitation current component is set in response to a position of a sheet, and thus the motor can be efficiently controlled.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-231771, filed Nov. 29, 2016, which is hereby incorporated by reference herein in its entirety.

What is claimed is:

1. A sheet conveying apparatus for conveying a sheet, the sheet conveying apparatus comprising:
   a conveyance roller configured to convey the sheet;
   a motor configured to drive the conveyance roller;
   a phase determiner configured to determine a rotation phase of a rotor of the motor; and
   a controller configured to control a drive current flowing through a winding of the motor so that a value of a torque current component generating torque in the rotor which is expressed in a rotating coordinate system based on a rotation phase determined by the phase determiner becomes a target value of the torque current component and to control a drive current flowing through the winding so that a value of an excitation current component affecting intensity of a magnetic flux penetrating through the winding which is expressed in the rotating coordinate system becomes a target value of the excitation current component,
   wherein the controller sets the target value of the torque current component so as to reduce a deviation between a command phase representing a target phase of the rotor and the rotation phase determined by the phase determiner,
   wherein, in a period in which the rotor rotates at a predetermined speed, the controller sets the target value of the excitation current component so that a magnetic flux penetrating through the winding in a first period which is after a leading edge of the sheet reaches a predetermined position on an upstream side of the conveyance roller in a conveyance direction to which the sheet is conveyed is weaker than a magnetic flux of the rotor, and sets the target value of the excitation current component so that a magnetic flux penetrating through the winding in a second period which is before the leading edge of the sheet reaches the predetermined position is stronger than the magnetic flux penetrating through the winding in the first period.

2. The sheet conveying apparatus according to claim 1, wherein, in the first period, the controller sets the target value of the excitation current component so that a magnetic flux penetrating through the winding in a third period from when the leading edge of the sheet reaches the predetermined position to when a trailing edge of the sheet reaches a second predetermined position on a downstream side of the conveyance roller in the conveyance direction is weaker than the magnetic flux of the rotor, and sets the target value of the excitation current component so that a magnetic flux penetrating through the winding in a fourth period which is after the trailing edge of the sheet reaches the second predetermined position is stronger than that in the third period.

3. The sheet conveying apparatus according to claim 2, wherein, in a period in which the rotor rotates, the controller sets the target value of the excitation current component to a negative value in the third period and sets the target value of the excitation current component to a value greater than the negative value in a period before the leading edge of the sheet reaches the predetermined position and a period after the trailing edge of the sheet reaches the second predetermined position.

4. The sheet conveying apparatus according to claim 3, wherein the controller switches the target value of the excitation current component from a value greater than the negative value to the negative value at a timing when the leading edge of the sheet reaches the predetermined position.

5. The sheet conveying apparatus according to claim 3, wherein the controller switches the target value of the excitation current component from the negative value to a value greater than the negative value at a timing when the trailing edge of the sheet reaches the second predetermined position.

6. The sheet conveying apparatus according to claim 3, further comprising a sheet detector disposed on an upstream side of a nip portion of the conveyance roller in the conveyance direction and configured to detect existence of the sheet,
wherein the controller switches the target value of the excitation current component from a value greater than the negative value to the negative value at a timing when the sheet detector detects the leading edge of the sheet.

7. The sheet conveying apparatus according to claim 3, wherein the controller switches the target value of the excitation current component from a value greater than the negative value to the negative value at a timing when a predetermined time elapses from a start of driving of the conveyance roller.

8. The sheet conveying apparatus according to claim 3 further comprising a second sheet detector disposed on a downstream side of a nip portion of the conveyance roller in the conveyance direction and configured to detect existence of the sheet,
wherein the controller switches the target value of the excitation current component from the negative value to a value greater than the negative value at a timing when the second sheet detector stops detecting the sheet.

9. The sheet conveying apparatus according to claim 3, wherein the controller switches the target value of the excitation current component from the negative value to a value greater than the negative value at a timing when a second predetermined time elapses from a start of driving of the conveyance roller.

10. The sheet conveying apparatus according to claim 2, wherein the controller sets the target value of the excitation current component to zero in the fourth period in a period in which the rotor rotates.

11. The sheet conveying apparatus according to claim 1, wherein, in a period in which the rotor rotates at a speed lower than the predetermined speed, the controller sets the target value of the excitation current component so that a magnetic flux penetrating through the winding is stronger than that in the first period.

12. The sheet conveying apparatus according to claim 1, wherein, in a case that a rotation speed of the rotor is less than a speed threshold value, torque which can be generated in the rotor in a state in which a value of the excitation current component is the negative value is less than or equal to torque which can be generated in the rotor in a state in which a value of the excitation current component is zero,
wherein, in a case that the rotation speed of the rotor is greater than or equal to the speed threshold value, torque which can be generated in the rotor in the state in which a value of the excitation current component is the negative value is greater than torque which can be generated in the rotor in the state in which a value of the excitation current component is zero, and
wherein the predetermined speed is a higher speed than the speed threshold value.

13. The sheet conveying apparatus according to claim 1, wherein the controller sets the target value of the excitation current component to zero in the second period in a period in which the rotor rotates.

14. The sheet conveying apparatus according to claim 1, wherein the controller gradually changes the target value of the excitation current component between a negative value and zero.

15. The sheet conveying apparatus according to claim 1, wherein the controller sets the target value of the excitation current component in response to a type of a sheet to be conveyed.

16. The sheet conveying apparatus according to claim 1, wherein the controller sets the target value of the excitation current component in response to a rotation speed of the rotor.

17. A sheet conveying apparatus for conveying a sheet, the sheet conveying apparatus comprising:
a conveyance roller configured to convey the sheet;
a motor configured to drive the conveyance roller;
a phase determiner configured to determine a rotation phase of a rotor of the motor;
a speed determiner configured to determine a rotating speed of the rotor; and
a controller configured to control a drive current flowing through a winding of the motor so that a value of a torque current component generating torque in the rotor which is expressed in a rotating coordinate system based on a rotation phase determined by the phase determiner becomes a target value of the torque current component and to control a drive current flowing through the winding so that a value of an excitation current component affecting intensity of a magnetic flux penetrating through the winding which is expressed in the rotating coordinate system becomes a target value of the excitation current component,
wherein the controller sets the target value of the torque current component so as to reduce a deviation between a command speed representing a target speed of the rotor and the rotation speed determined by the speed determiner,
wherein, in a period in which the rotor rotates at a predetermined speed, the controller sets the target value of the excitation current component so that a magnetic flux penetrating through the winding in a first period which is after a leading edge of the sheet reaches a predetermined position on an upstream side of the conveyance roller in a conveyance direction to which the sheet is conveyed is weaker than a magnetic flux of the rotor, and sets the target value of the excitation current component so that a magnetic flux penetrating through the winding in a second period which is before the leading edge of the sheet reaches the predetermined position is stronger than the magnetic flux penetrating through the winding in the first period.

18. A document feeding apparatus for feeding a document, the document feeding apparatus comprising:
- a document tray configured to stack a document thereon;
- a conveyance roller configured to convey the document stacked on the document tray;
- a motor configured to drive the conveyance roller;
- a phase determiner configured to determine a rotation phase of a rotor of the motor;
- a speed determiner configured to determine a rotating speed of the rotor; and
- a controller configured to control a drive current flowing through a winding of the motor so that a value of a torque current component generating torque in the rotor which is expressed in a rotating coordinate system based on a rotation phase determined by the phase determiner becomes a target value of the torque current component and to control a drive current flowing through the winding so that a value of an excitation current component affecting intensity of a magnetic flux penetrating through the winding which is expressed in the rotating coordinate system becomes a target value of the excitation current component,
- wherein the controller sets the target value of the torque current component so as to reduce a deviation between a command speed representing a target speed of the rotor and the rotation speed determined by the speed determiner,
- wherein, in a period in which the rotor rotates at a predetermined speed, the controller sets the target value of the excitation current component so that a magnetic flux penetrating through the winding in a first period which is after a leading edge of the sheet reaches a predetermined position on an upstream side of the conveyance roller in a conveyance direction to which the sheet is conveyed is weaker than a magnetic flux of the rotor, and sets the target value of the excitation current component so that a magnetic flux penetrating through the winding in a second period which is before the leading edge of the sheet reaches the predetermined position is stronger than the magnetic flux penetrating through the winding in the first period.

19. A document reading apparatus for reading an image on a document, the document reading apparatus comprising:
- a document tray configured to stack a document thereon;
- a conveyance roller configured to convey the document stacked on the document tray;
- a reading unit configured to read the document conveyed by the conveyance roller;
- a motor configured to drive the conveyance roller;
- a phase determiner configured to determine a rotation phase of a rotor of the motor;
- a speed determiner configured to determine a rotating speed of the rotor; and
- a controller configured to control a drive current flowing through a winding of the motor so that a value of a torque current component generating torque in the rotor which is expressed in a rotating coordinate system based on a rotation phase determined by the phase determiner becomes a target value of the torque current component and to control a drive current flowing through the winding so that a value of an excitation current component affecting intensity of a magnetic flux penetrating through the winding which is expressed in the rotating coordinate system becomes a target value of the excitation current component,
- wherein the controller sets the target value of the torque current component so as to reduce a deviation between a command speed representing a target speed of the rotor and the rotation speed determined by the speed determiner,
- wherein in a period in which the rotor rotates at a predetermined speed, the controller sets the target value of the excitation current component so that a magnetic flux penetrating through the winding in a first period which is after a leading edge of the sheet reaches a predetermined position on an upstream side of the conveyance roller in a conveyance direction to which the sheet is conveyed is weaker than a magnetic flux of the rotor, and sets the target value of the excitation current component so that a magnetic flux penetrating through the winding in a second period which is before the leading edge of the sheet reaches the predetermined position is stronger than the magnetic flux penetrating through the winding in the first period.

20. An image forming apparatus for forming an image on a recording medium, the image forming apparatus comprising:
- a conveyance roller configured to convey the recording medium;
- an image forming unit configured to form an image on the recording medium conveyed by the conveyance roller;
- a motor configured to drive the conveyance roller;
- a phase determiner configured to determine a rotation phase of a rotor of the motor;
- a speed determiner configured to determine a rotating speed of the rotor; and
- a controller configured to control a drive current flowing through a winding of the motor so that a value of a torque current component generating torque in the rotor which is expressed in a rotating coordinate system based on a rotation phase determined by the phase determiner becomes a target value of the torque current component and to control a drive current flowing through the winding so that a value of an excitation current component affecting intensity of a magnetic flux penetrating through the winding which is expressed in the rotating coordinate system becomes a target value of the excitation current component,
- wherein the controller sets the target value of the torque current component so as to reduce a deviation between a command speed representing a target speed of the rotor and the rotation speed determined by the speed determiner,
- wherein, in a period in which the rotor rotates at a predetermined speed, the controller sets the target value of the excitation current component so that a magnetic flux penetrating through the winding in a first period which is after a leading edge of the sheet reaches a predetermined position on an upstream side of the conveyance roller in a conveyance direction to which the sheet is conveyed is weaker than a magnetic flux of the rotor, and sets the target value of the excitation current component so that a magnetic flux penetrating through the winding in a second period which is before the leading edge of the sheet reaches the predetermined position is stronger than the magnetic flux penetrating through the winding in the first period.

* * * * *